United States Patent [19]

Nettli

[11] 3,974,069

[45] Aug. 10, 1976

[54] PROCESS FOR THE DEHYDRATION OF FATTY SLUDGE AND THE RECOVERY OF CHEMICALS

[76] Inventor: Per Oscar Nettli, Undelstadveien 33D, 1370 Asker, Norway

[22] Filed: Oct. 20, 1975

[21] Appl. No.: 624,166

Related U.S. Application Data

[63] Continuation of Ser. No. 496,014, Aug. 7, 1974, abandoned.

[30] Foreign Application Priority Data

Jan. 28, 1974 Norway................................ 247/74

[52] U.S. Cl................................... 210/45; 210/52; 210/56; 260/112 R; 260/412.5; 260/424; 260/425

[51] Int. Cl.²........................................ C02B 1/20

[58] Field of Search.................... 210/10, 18, 42, 44, 210/45, 46, 47, 49, 51, 52, 53, 56; 260/112 R, 412.5, 424, 425

[56] References Cited
UNITED STATES PATENTS

| | | | |
|---|---|---|---|
| 966,196 | 8/1910 | Goodman | 210/51 |
| 1,430,182 | 9/1922 | Peck | 210/44 |
| 2,204,703 | 6/1940 | Sanders | 210/53 |
| 2,328,361 | 8/1939 | Sanders | 210/56 |
| 2,522,140 | 10/1950 | Shawcross | 210/42 |
| 2,902,501 | 9/1951 | Clayton | 260/412.5 |
| 3,350,301 | 10/1967 | Hoffman | 210/44 |
| 3,428,660 | 2/1969 | Morren | 260/424 |
| 3,440,167 | 4/1969 | Clark | 210/42 |
| 3,491,080 | 1/1970 | Ehrensvard | 260/112 R |
| 3,519,662 | 7/1970 | Gruver | 260/112 R |
| 3,677,940 | 7/1942 | Fujmoto | 210/44 |
| 3,772,191 | 11/1963 | Thorn | 210/10 |
| 3,812,032 | 5/1974 | Chapperil | 210/56 |
| 3,936,375 | 2/1976 | Nettli | 210/45 |

FOREIGN PATENTS OR APPLICATIONS

| | | | |
|---|---|---|---|
| 1,928,689 | 6/1969 | Germany | 210/42 |

Primary Examiner—Charles N. Hart
Assistant Examiner—Ernest G. Therkorn
Attorney, Agent, or Firm—Haseltine, Lake & Waters

[57] ABSTRACT

A process is disclosed for concentrating a fattyسludge precipitated from a fatty and proteinaceous aqueous emulsion by successive addition of hydrolyzable metals salts and alkaline earth salts thereto and subsequently separated from the aqueous portion of the emulsion, comprising acidifying the separated fatty sludge with mineral acid and allowing a supernatant concentrated sludge to form above an aqueous phase. The supernatant concentrated sludge which is formed may be heated preferably to boiling either separately or without separation from the aqueous phase to further concentrate the sludge and produce a fatty acid containing supernatant phase. The chemicals originally used for precipitating the fatty sludge may be recovered from the aqueous phase.

6 Claims, No Drawings

PROCESS FOR THE DEHYDRATION OF FATTY SLUDGE AND THE RECOVERY OF CHEMICALS

This application is a continuation application of Ser. No. 496,014, filed Aug. 7, 1974, now abandoned.

This invention represents a further development of the process according to Assignee's copending patent application by Hall, Ser. No. 440,574, filed Feb. 7, 1974 now abandoned. The present invention relates to a process for further treatment of the fatty sludge obtained by the process described in said previous application.

Patent application Ser. No. 440,574 relates to a process for stablilizing and recovering fats, fatty substances, proteins, proteinaceous substances and the breakdown products of these substances from process water containing said substances and is characterized in that an acid hydrolysing metal salt is added in a quantity sufficient to bind the organic substances present into a complex, additional, mineral acid being added, if necessary, at the same time as or after the aforesaid additive, to lower the pH to 5 or below. The complex is thereafter precipitated by raising the pH to 6 or above by adding a base before, during or after adding alkaline earth ions.

One purpose of the process according to the present invention is to dehydrate and so reduce the volume of the fatty sludge obtained from the process according to said previous patent application, thus concentrating the sludge. A further purpose of the process according to the present invention is to make it possible, if desired, to recover the precipitation chemicals used in the process according to said previous patent application.

Unexpectedly it has now been discovered that by adding mineral acid to the fatty sludge produced according to patent application Ser. No. 440,574, one can substantially concentrate the sludge. By the addition of mineral acid the fatty portion of the sludge becomes insoluble and one obtains a supernatant dehydrated sludge phase and an underlying, substantially aqueous phase. The supernatant phase, which consists of the concentrated sludge, can thus be removed.

If one wishes to recover the precipitation chemicals in the concentrated sludge, the sludge must be heated — preferably to boiling point. Two phases will then again form, a supernatant phase containing mainly fatty acids and an underlying, aqueous phase containing the precipitation chemicals. This aqueous phase, which contains the precipitation chemicals, can be recirculated for use in the process according to said previous patent application Ser. No. 440,574.

The present process thus relates to the treatment of fatty sludge obtained by precipitation with acid hydrolyzing metal salts, in combination with alkaline earth salts and/or alkaline salts. By means of this novel process water is segregated and the sludge thereby concentrated, whereby, if desired, precipitation chemicals can be recovered from the concentrated sludge. According to the process mineral acid is added to the fatty sludge to produce a pH preferably lower than 2, whereby an underlying aqueous phase and a supernatant, concentrated fatty sludge phase are obtained and allowed to separate. The supernatant concentrated fatty sludge phase may be heated and boiled, either while remaining in contact with the underlying aqueous layer or after being separated from the underlying aqueous layer, so that there is obtained an underlying aqueous phase containing the used precipitation chemicals and supernatant phase containing technical fatty acid.

In an especially preferred form of the process according to the present invention, there is used as the mineral acid for dehydration the highly acid effluent obtained from the decomposition of soap, so-called "soap stock", in the fat refining industry. It is, however, particularly advantageous to use hydrochloric acid, ask precipitation of gypsum is thereby avoided, particularly in connection with heating and boiling the concentrated sludge. The invention is further illustrated below by means of the following examples:

EXAMPLE I

The sludge used for the experiments was sludge from pilot tests on a technical scale for the stabilization and recovery of fats and fatty substances from process water in a combined fat refining/margarine factory by means of chemical precipitation with $FeCl_3$, $CaCl_2$ and $Ca(OH)_2$.

The following experiments were carried out:

1.1 Heating 150 ml sludge on a hotplate almost to boiling point resulted only in a slight non-homogeneity in the sludge, which disappeared upon stirring.

1.2 Concentrated sulphuric acid was added dropwise to 150 ml of sludge while stirring until rapid separation into two phases occurred. The measured pH was 1.5 after the addition of 2.5 ml concentrated sulphuric acid. The supernatant concentrated sludge phase, which was porous and floating, was easily removed with a spoon and was collected as a specimen marked "sludge conc. 1.2"; the aqueous phase was filtered and collected as a specimen marked "hydrous phase 1.2".

1.3 3 ml concentrated sulphuric acid was added dropwise to 150 ml sludge while stirring. Rapid separation into two phases was observed at a pH of 1.2. The supernatant concentrated sludge phase appeared more compact and had a volume of only 25 ml. The aqueous phase was slightly cloudy. The whole mixture was heated, whereupon the layer of sludge that had formed turned darker and contracted to a volume of about 10 ml. Large, light gypsum flocks formed in the aqueous phase and sank to the bottom.

Upon boiling, the fatty acid separated from the sludge phase as dark drops on the surface, whhile the separated aqueous phase was turned yellow by the iron (III) ions. The fatty acid drops collected into a coherent layer and were collected as a specimen marked "fatty acid 1.3".

1.4 7 ml concentrated nitric acid was added to 150 ml sludge to avoid precipitation of gypsum. A spongy and coherent concentrated sludge phase separated and floated up. A specimen was taken from the concentrated sludge phase and marked "sludge conc. 1.4".

1.5 3 ml concentrated sulphuric acid was added quickly to 150 ml sludge while stirring vigorously. Rapid separation of 20 ml coherent sludge which floated well occurred.

The results are tabulated in Table I.

Table I

| Test | Specimen | Treatment | Volume ml | Fat content | % of total |
|---|---|---|---|---|---|
| 1.1 | Sludge | None | 150 | 1.803 | 100.0 |
| 1.2 | Concentrated sludge | $H_2SO_4$, 2.5 ml. | 52 | 1.746 | 96.9 |
|  | Aqueous phase | $H_2SO_4$, 2.5 ml. | 98 | 0.048 | 2.7 |
| 1.3 | Concentrated sludge | $H_2SO_4$, 3.0 ml | 25 |  |  |
|  | Aqueous phase | $H_2SO_4$, 3.0 ml | 125 | 0.107 | 5.9 |
|  | Fatty acid | Brief boil | 12 | 1.683 | 93.3 |
| 1.4 | Concentrated sludge | $HNO_3$, 7.0 ml | 30 | 1.702 | 94.4 |
| 1.5 | Concentrated sludge | $H_2SO_4$, 3.0 ml | 20 | 1.723 | 95.7 |

The aqueous phases brownish tests 1.2 and 1.3 were different, since aqueous phase 1.3, which was removed after the deacidized sludge specimen had been boiled, had a strong yellow color. when both specimens were neutralized by $NH_3$, sedimentation from specimen 1.3 was heavy and browish in color, while sedimentation from specimen 1.2 was sparse and almost white.

Rhodanide reaction of the dissolved sediments clearly identified a high Fe content in hydrous phase 1.3, while hydrous phase 1.2 contained only an insignificant amount of Fe.

It is thus obvious that it is also possible to recover the precipitation agent by heating the sludge. The sludge is thereby split into a free fatty acid phase which floats up and the precipitation agent (cation) which is liberated and contained in the aqueous phase.

EXAMPLE II

The sludge used for the experiment was fatty sludge obtained by flotation, recovered from process water from a margarine factory by sedimentation and stabilization by $Al_2(SO_4)_3$, $CaCl_2$ and $NaOH$.

By adding hydrochloric acid to the fatty sludge until the pH was 1.6, the sludge was split into two phases, a supernatant concentrated sludge phase and an underlying aqueous phase.

Fat analyses of the two phases were carried out and the volume of the phases was measured. Th analyses are tabulated in Table II.

Table II

| Specimen | Treatment | g Fat | Volume in ml |
|---|---|---|---|
| Sludge | None | 2.648 | 250 |
| Concentrated sludge | Acid | 2.622 | 14 |
| Aqueous phase | Acid | 0.023 | 236 |
| Sludge | None | 0.701 | 250 |
| Concentrated sludge | Acid | 2.625 | 13 |
| Aqueous phase | Acid | 0.076 | 237 |

As the analyses show, only a very small portion of the fat passes into the aqueous phase (about 100 – 300 ppm) and at the same time the fatty sludge is greatly concentrated, i.e. from about 1000 ml to about 56 ml.

EXAMPLE III

The sludge used for the experiment was fatty sludge obtained by flotation, recovered from condensate as they occur from the production of meat/bone meal (sterilizing, boiling, drying) by means of sedimentation and stabilization by $FeCl_3$, $H_2SO_4$ and $Ca(OH)_2$.

By acidifying the sludge to pH 1.8 with hydrochloric acid, the sludge was split into two phases, supernatant concentrated sludge phase and an underlying aqueous phase. The concentrated sludge phase was removed by skimming and was further treated by boiling for 10 minutes. Upon boiling, dark liquid drops of fatty acid separated and collected in a liquid phase. This liquid fatty acid phase was drawn off in a separatory funnel and the fat content determined. The analyses are tabulated in Table III.

Table III

| Specimen | Treatment | g Fat | Volume in ml |
|---|---|---|---|
| Sludge | None | 2.693 | 250 |
| Concentrated sludge | HCl to pH 1.8 | — | 18 |
| Fatty acid phase |  | 2.532 | 8 |

I claim:

1. A process for concentrating a precipitated stabilized fatty sludge which has been recovered from a fatty, proteinaceous, aqueous emulsion waste effluent, said stabilized sludge being obtained by adding to the effluent an acid hydrolyzing metal salt in an amount sufficient to bind organic material present into a complex and reducing the pH to below 5, whereafter the formed complex is precipitated, in the presence of alkaline earth ions by raising the pH to 6–9, whereafter the thus formed stabilized sludge is separated, which process consists essentially of the steps of acidifying said stabilized sludge to a pH less than 2, to thereby form a first aqueous phase and a supernatant, concentrated fatty phase which is separated from said first aqueous phase, heating said separated, concentrated fatty phase to form thereby a free fatty acid-containing liquid phase and a second aqueous phase which contains the precipitation chemicals of said stabilized fatty sludge, and separating said free fatty acid-containing liquid phase from said second aqueous phase.

2. The process of claim 1, wherein acidifying is affected by the addition of acid effluent from the decomposition of soap stock.

3. The process of claim 2, wherein said second aqueous phase containing the precipitating chemicals, after separation of said free fatty acid-containing phase therefrom is reused as a precipitant.

4. The process of claim 1, wherein said second aqueous phase containing the precipitating chemicals, after separation of said free fatty acid-containing phase therefrom, is reused as precipitant.

5. The process of claim 1 wherein said effluent is the effluent from a margarine factory.

6. The process of claim 1 wherein said effluent is the effluent from a meat/bone meal factory.

* * * * *

UNITED STATES PATENT AND TRADEMARK OFFICE
CERTIFICATE OF CORRECTION

PATENT NO. : 3,974,069
DATED : August 10, 1976
INVENTOR(S) : Per Oscar Nettli

It is certified that error appears in the above–identified patent and that said Letters Patent are hereby corrected as shown below:

In the heading of the patent, add the assignee name, as follows:

"A/S Apothekernes Laboratorium for Specialpraeparater".

Signed and Sealed this

Fourth Day of January 1977

[SEAL]

*Attest:*

RUTH C. MASON
*Attesting Officer*

C. MARSHALL DANN
*Commissioner of Patents and Trademarks*